March 18, 1941. A. C. HORESI 2,235,683
DRYING PROCESS
Filed July 11, 1938
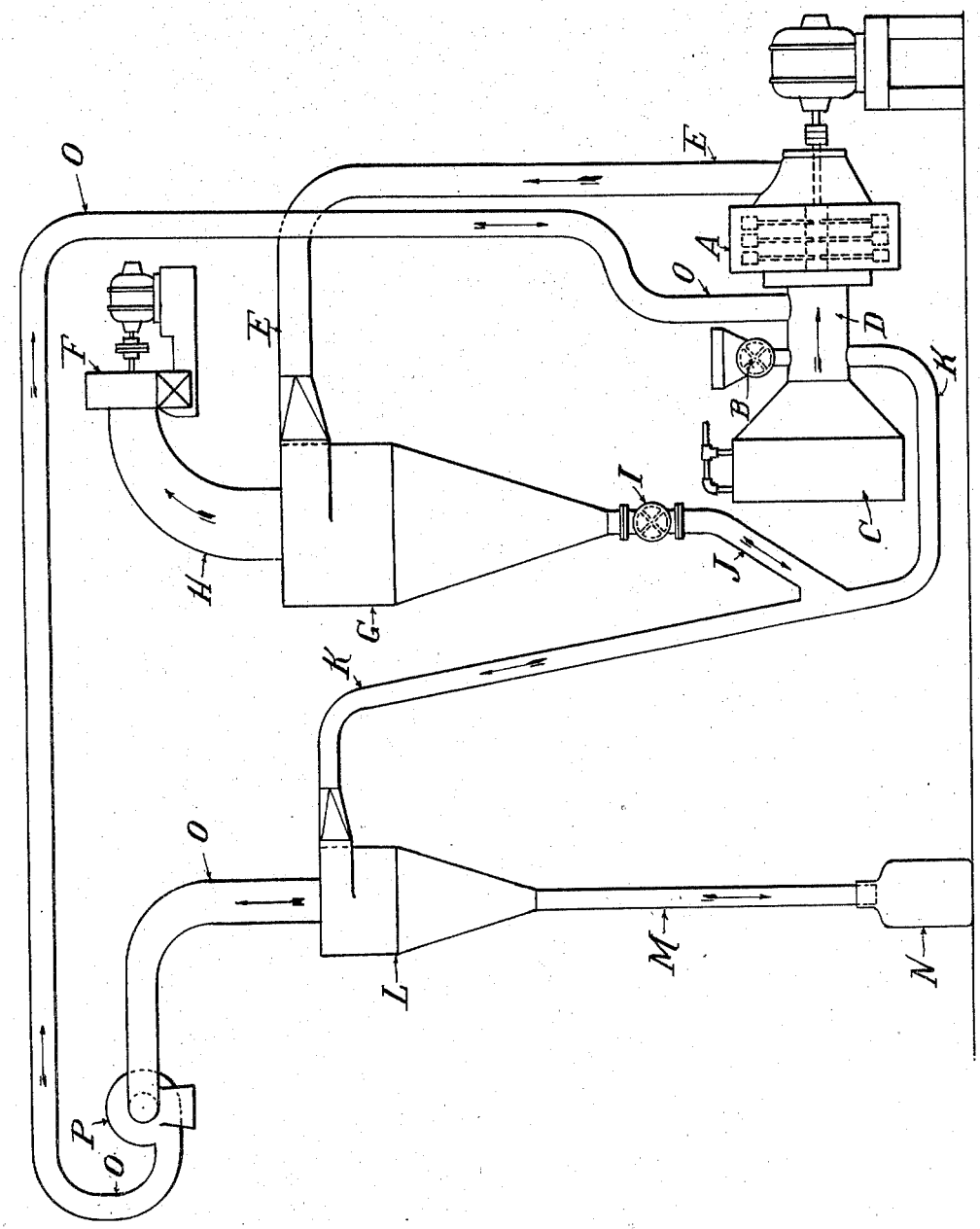
Inventor
Anthony C. Horesi
By Barnett & Truman,
Attorneys Patented Mar. 18, 1941

2,235,683

UNITED STATES PATENT OFFICE 2,235,683

DRYING PROCESS

Anthony C. Horesi, Downers Grove, Ill., assignor to Corn Products Refining Company, New York, N. Y., a corporation of New Jersey Application July 11, 1938, Serial No. 218,663

11 Claims. (Cl. 34—24)

This invention relates to the drying of materials existing in, or capable of being reduced to a finely divided state; and particularly to the drying of materials of an organic character which, under ordinary conditions can not be subjected to high temperatures without injury or detrimental change.

Starch is primarily a material of this sort; and one of the objects of the invention is to provide a novel method of continuously drying starch, using air, or other drying gas, at high temperatures, so manipulated, however, that the starch is not gelatinized in spite of the fact that the air is heated to a temperature very much higher than the gelatinizing temperature of the starch; the continuous operation and the employment of high temperatures making the process quick, convenient and economical in comparison with starch drying processes now in common use. Of these common methods two are most frequently used, both being based upon the assumption that, as starch containing, say 45% of water (the usual water content of starch from the washing filters), will gelatinize at about 150° F., it is not feasible to apply a drying gas to the starch at temperatures above 150° F., until sufficient water has been removed to prevent gelatinization. One common method of drying starch is the kiln method. According to this method the starch is placed on trays, or in vertical compartments having foraminous walls, and moved through drying tunnels through which heated air is moved in opposite direction to the movement of the starch, great care being taken that the air coming into contact with the 45% moisture starch should not be at the temperature above 150° F. The air may in fact enter the kiln at about 225° F., but this temperature is reduced to about 140° F. before it comes in contact with the wet or entering starch.

The other common method of drying starch involves the use of a rotary drier. The air enters the drier at about 300° F. but meets the partially dried starch. By the time the air has reached the wet starch entering the other end of the drier, its temperature has been reduced to about 140° F.

According to the method of the present invention, starch of 40%–50% water content, or less, may be dried, in a continuous operation, by contact with air heated to temperatures of 300° F., or even much higher, up to 1000° F., without producing the gelatinization or other detrimental effect. This has been found to be possible if the starch cake (the starch having a water content as above indicated and being in a moist but non-fluent state) is disintegrated by a milling operation which reduces it to a finely divided state in which the starch particles are suspended in the air through action of an air stream through the mill. In such state the evaporation of the water is so rapid that even with the drying gas at high temperatures, far beyond the gelatinizing temperature of starch, gelatinization does not take place. With the starch particles dispersed and suspended in the air, the aggregate of the surfaces at which evaporation can take place is so large that the heat of the drying gas is converted into the latent heat of evaporation, and enough of the water evaporated, all in such a short time that the starch is not gelatinized. The starch is quite as free from gelatinized particles as starch dried under the old processes. The starch dried by the process of this invention is freer from bacteria and dirt and has a higher "mobility" than starch kiln dried and powdered by milling to the same degree of fineness. By "mobility" is meant speed in passing through a screen. The starch from this process is in powder form, whereas kiln dried starch, if a powder is desired, is pearled and must be ground.

The process may also be employed on starch and water mixtures containing more water than indicated above.

A further object of the invention is to provide a system of starch drying in which there will be no escape of starch dust to the atmosphere. A starch drying operation, if the starch is dried to the usual air-dry state in which it contains about 12% moisture, produces about 5% to 10% of dried starch particles which are so small that they will float in the air and may be regarded as dust. These particles can not be economically separated from the air by ordinary mechanical separators. If this dust escapes from the drying apparatus, a loss of starch results and there will be danger of starch dust explosions. According to the present process, all of the air discharged from the apparatus is substantially dust free.

The herein disclosed apparatus may be used for drying other products such as corn gluten, and slop, also sewage sludge, various cereal wet milling products, coal slurries, gypsum, sulphur and the like, any material, in fact, which is in a finely divided state or can be reduced to a finely divided state.

The invention is illustrated, in a preferred embodiment, in the accompanying drawing which is, however, more or less diagrammatic. The apparatus shown is a preferred apparatus for carrying out the process, but the process is not to be considered as limited to the use of this particular apparatus.

Referring to the drawing, A designates a mill of any preferred type, such as the hammer mill indicated, into which the starch is fed by means of the rotary feeding device B. C is an air heater connected by pipe D with the mill A. The starch cake is reduced in the mill to a finely divided state and the starch particles are put into suspension by air introduced into the mill through pipe D. Evaporation takes place instantaneously reducing the moisture content of the starch to about 20%. With this percentage of moisture, the starch is in a pulverulent state and is carried through the pipe E by fan F to the cyclone collector G which may be of usual construction. The material is damp enough, however, to be dustless at this stage, and the excess air withdrawn from the dust collector G through pipe H may be discharged to the atmosphere with no attendant disadvantage. The starch is fed by the rotary feeder I from the hopper of the dust collector into a pipe J which joins a hot air pipe K leading from the heater C to a second cyclone separator L. The air entering the mill through pipe D, and the air passing through the pipe K may be at temperatures of 300° F. or higher. The application of heat to the starch powder delivered into the pipe K further reduces the moisture in the starch to about 12%. The starch from the separator L passes through spout M to any suitable receptacle for receiving it, such as the bag N.

The starch entering the separator L will have a low enough moisture content so that there will be a certain quantity of dust too fine to be separated from the air by the separator. The air from the cyclone separator L is therefore not discharged to the atmosphere but is conducted through pipe O, provided with a fan P, to the mill A, pipe O being shown as tapped into pipe D.

A practical operation of the process as applied to starch having a moisture content of 45% (higher moistures naturally requiring higher temperatures or greater air flow) is as follows: 3000 cubic feet of air is drawn through the air heater per minute and heated to 300° F. 1500 cubic feet of this air passes into the mill through the pipe connection D. 1500 cubic feet passes through pipe K to the separator L. 45% moisture starch cake is fed into the mill at the rate of 16 pounds per minute. The starch entering the separator G contains 20% of moisture and the air discharged from this separator is dust free. The moisture content of the starch entering the separator L is 12%. The air discharged from the separator L and returned to the mill may contain between 5% and 10%, on dry substance basis, of the starch treated, and is recovered by being sent back to the mill A.

I claim:

1. Process of drying starch in a moist but non-fluent state without substantial gelatinization of the starch which comprises: subjecting the starch cake to a milling operation which reduces it to a finely divided state; and simultaneously subjecting the starch in this state to contact with a stream of drying gas from a source outside the process and heated to a temperature above the gelatinizing temperature of the starch to instantaneously remove the major portion of the moisture.

2. Process of drying starch in a moist but non-fluent state without substantial gelatinization of the starch which comprises: subjecting the starch cake to a milling operation which reduces it to a finely divided state; simultaneously subjecting the starch in this state to contact with a stream of drying gas from a source outside the process and heated to a temperature above the gelatinizing temperature of the starch to instantaneously remove the major portion of the moisture from the starch and reduce it to a pulverulent state; and thereafter subjecting the partially dried starch in suspension to another stream of heated drying gas.

3. Process of drying starch in a moist but non-fluent state which comprises: subjecting the starch cake to a milling operation which reduces it to a finely divided state; simultaneously subjecting the starch in this state to contact with a stream of drying gas at a temperature to reduce the moisture content of the starch to about 20% or less without substantial gelatinization of the starch; and thereafter subjecting the partially dried starch in suspension to another stream of heated drying gas to further reduce the moisture content of the starch.

4. Process of drying starch in a moist but non-fluent state without substantial gelatinization which comprises: subjecting the starch cake to a continuous milling operation which reduces it to a finely divided state; and simultaneously subjecting the starch in this state, continuously, to contact with a stream of drying gas at a temperature of not less than 300° F.

5. Process of drying starch containing a substantial amount of water without substantial gelatinization which comprises: subjecting the starch continuously to a milling operation which reduces the material to a finely divided state and simultaneously subjecting the material in this state, and with the starch particles in suspension, to a stream of heated drying gas from a source outside the process to instantaneously evaporate water from the starch.

6. Process of drying starch containing a substantial amount of water without substantial gelatinization which comprises: subjecting the starch continuously to a milling operation which reduces the material to a finely divided state and simultaneously subjecting the material in this state, and with the starch particles in suspension, to a stream of heated air from a source outside the process to instantaneously evaporate water from the starch and to reduce the starch to a pulverulent but substantially dustless state, separating air from the starch and discharging the air to the atmosphere; subjecting the starch in this state, and in suspension, to another stream of heated air to further reduce the water content; and separating the air and dust from the starch and returning the dust laden air to the milling operation.

7. Process of drying starch containing about 40%–50% of water, without substantial gelatinization of the starch, which comprises: subjecting the starch continuously to a milling operation which reduces the material to a finely divided state; simultaneously subjecting the material in this state to a stream of air heated to at least 300° F. to instantaneously evaporate water from the starch, reducing it to a water content of about 20%; separating air from the starch and discharging the air to the atmosphere; subjecting the starch in this state and in suspension to another stream of heated air to reduce the water content to about 12%; separating the air and dust from the starch; and returning the dust laden air to the milling operation.

8. Process of drying starch containing not substantially in excess of 50% moisture without substantial gelatinization of the starch which comprises: subjecting the starch continuously to a milling operation which reduces the material to a finely divided state; simultaneously subjecting the material in this state to a stream of air heated to at least 300° F. to instantaneously evaporate water from the starch, reducing it to a water content of about 20%; separating air from the starch and discharging the air to the atmosphere; subjecting the starch in this state and in suspension to another stream of heated air to reduce the water content to about 12%; separating the air and dust from the starch; and returning the dust laden air to the milling operation.

9. Process of drying starch containing a substantial amount of water, for the production of powdered starch of low bacteria and dirt content and high mobility which comprises: subjecting the starch to a milling operation which reduces it to a finely divided state; and simultaneously subjecting the starch to contact with a stream of heated drying gas capable of absorbing instantaneously a sufficient amount of the water in the starch to reduce the starch without substantial gelatinization to a pulverulent state.

10. Process of drying starch containing a substantial amount of water, to a powdered state which comprises: subjecting the wet starch to a milling operation which reduces it to a finely divided state; and simultaneously subjecting the starch to contact with a stream of heated drying gas capable of absorbing instantaneously a sufficient amount of the water in the starch to reduce it without substantial gelatinization to a pulverulent state.

11. Process of drying starch containing not substantially less than 40% of moisture to a powdered state which comprises: subjecting the wet starch to a milling operation which reduces it to a finely divided state; and simultaneously subjecting the starch to contact with a stream of heated drying gas capable of absorbing instantaneously a sufficient amount of the water in the starch to reduce it without substantial gelatinization to a pulverulent state.

ANTHONY C. HORESI.